United States Patent
Liu

(12) 
(10) Patent No.: US 8,093,822 B2
(45) Date of Patent: Jan. 10, 2012

(54) LED DRIVER AND CONTROL METHOD THEREOF

(75) Inventor: Jing-Meng Liu, Jubei (TW)

(73) Assignee: Richtek Technology Corp., Hsinchu (TW)

( * ) Notice: Subject to any disclaimer, the term of this patent is extended or adjusted under 35 U.S.C. 154(b) by 851 days.

(21) Appl. No.: 12/216,837

(22) Filed: Jul. 11, 2008

(65) Prior Publication Data

US 2009/0015178 A1 Jan. 15, 2009

(30) Foreign Application Priority Data

Jul. 13, 2007 (TW) .............................. 96125669 A

(51) Int. Cl.
*H05B 37/02* (2006.01)

(52) U.S. Cl. ...................... 315/224; 315/185 R; 315/307

(58) Field of Classification Search .................. 315/291, 315/307, 308, 224, 185 R, 193
See application file for complete search history.

(56) References Cited

U.S. PATENT DOCUMENTS

| 7,902,771 B2 * | 3/2011 | Shteynberg et al. ........... 315/307 |
| 7,906,917 B2 * | 3/2011 | Tripathi et al. ................ 315/291 |

* cited by examiner

*Primary Examiner* — David Hung Vu
(74) *Attorney, Agent, or Firm* — Rosenberg, Klein & Lee

(57) ABSTRACT

An LED driver providing an LED lighting current to an LED path, extracts the LED lighting current information from the LED path to produce a first signal including an AC component and a DC component, and extracts the DC component information of the first signal to produce a second signal to regulate an average of the LED lighting current. This LED driver implements real constant average current regulation for an LED lighting apparatus, eliminates the need of output capacitor as well as rectifier diode in most applications to simplify the circuit of the power stage, and is applicable to power stages of various modes.

87 Claims, 20 Drawing Sheets

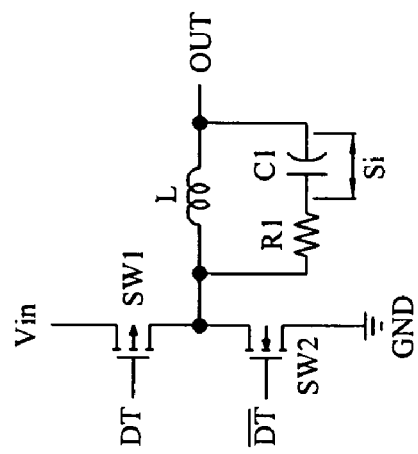
Fig. 25
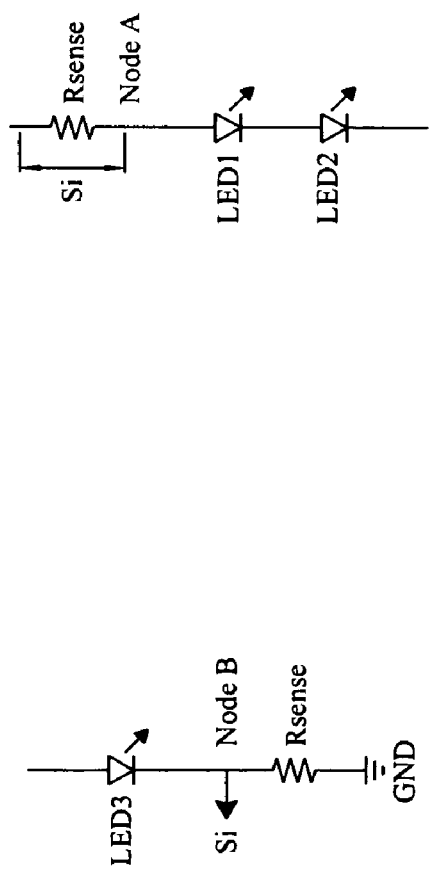
Fig. 24
Fig. 23

LED DRIVER AND CONTROL METHOD THEREOF

FIELD OF THE INVENTION

The present invention is related generally to a light emitting diode (LED) driver and, more particularly, to a circuit and method for constant average current regulation of an LED lighting apparatus.

BACKGROUND OF THE INVENTION

There are two typical methods for LED lighting control. One of them is constant average current modulation, such as the controller chip RT9271 (http://www.richtek.com/www/Docs/DS9271-13.pdf) of Richtek Technology Corporation, and the other is constant peak current modulation, such as the controller chip AMC7150 (http://www.addmtek.com/Datasheet/DD034-AMC7150%20_A.pdf) of ADDtek Corporation and the controller chip HV9910 (http://www.supertex.com/pdf/datasheets/HV9910.pdf) of Supertex Incorporation.

FIG. 1 is an application circuit given in the data sheet of RT9271. In a controller chip 10, a power switch (not shown) is connected between a switch pin LX and a ground pin GND for being switched in response to a pulse width modulation (PWM) signal to regulate the current $I_{LED}$ supplied to light emitting diodes LED1-LED3. This control scheme requires a rectifier diode D and an output capacitor Cout for filtering so as to provide a stable average current for the light emitting diodes LED1-LED3. However, to reduce the ripple of the current $I_{LED}$, the output capacitor Cout requires a greater capacitance and thus this prior art requires a larger and more costly component for the capacitor. Further, since the light emitting diodes LED1-LED3 are serially connected on a current path, the output capacitor Cout will need to sustain a high voltage, which also causes this prior art to require a larger and expensive component.

FIG. 2 is an application circuit given in the data sheet of AMC7150. In a controller chip 12, a power switch (not shown) is connected between a current sense pin Is and an output pin OUT for being switched in response to a modulation signal so as to regulate the current $I_{LED}$ supplied to light emitting diodes LED1 and LED2. FIG. 3 is an application circuit given in the data sheet of HV9910. An output pin Gate of a controller chip 14 provides a modulation signal to switch a power switch SW, so as to regulate the current $I_{LED}$ supplied to light emitting diodes LED1 and LED2. The output capacitor Cout in the circuit of FIG. 3 may be removed without destroying the control. As shown in FIG. 4, each of the LED lighting controllers of FIGS. 2 and 3 employs a peak current control scheme which sets a threshold $I_{PK}$ as the peak current. When the current LED rises up to the threshold $I_{PK}$, a control signal is triggered to decrease the current $I_{LED}$. For example, in the control scheme of FIG. 3, during a time period Ton where the power switch SW is on, the current $I_{LED}$ increases, as shown by the time period Ton of the waveform 16 in FIG. 4. When the current $I_{LED}$ reaches the threshold $I_{PK}$, the power switch SW is turned off and the current $I_{LED}$ begins decreasing, as shown in the time period Toff of FIG. 4.

Although the control circuits of FIGS. 2 and 3 can provide stable LED current without the need of large output capacitor Cout as required by the control circuit of FIG. 1, they are inherently disadvantageous to some applications due to the constant peak current control. In such control scheme, when the input voltage Vin varies, the slope and valley value of the LED current vary accordingly and thus it causes variation of the average LED current. The Vin dependent average LED current variation is especially worse in Boost mode or Buck-Boost mode configurations. FIG. 5 depicts a boost LED driver and FIG. 6 shows the variation of the inductor current IL of this driver as a consequence of the variation of the input voltage Vin. During the time period that the power switch SW is on, the inductor current IL flows from the power input Vin toward the ground terminal GND through the power switch SW. Then, after the power switch SW is turned off, the inductor current IL redirects to the light emitting diodes LED1 and LED2. In other words, only when the power switch SW is off, there is current supplied to the light emitting diodes LED1 and LED2. However, when the input voltage Vin is higher, the inductor current IL increases at a higher speed, and thus the power switch SW will have a shorter on time Ton1 for the current threshold $I_{PK}$ to be reached, as shown by the waveform 18 in FIG. 6. On the contrary, when the input voltage Vin is lower, the inductor current IL increases slower, and longer on time Ton2 is required for the power switch SW, so as for the peak current $I_{PK}$ to be reached, as shown by the waveform 20 in FIG. 6. Since the on-time Ton of the power switch SW varies along with the variation of the input voltage Vin, the average current flowing through the light emitting diodes LED1 and LED2 also varies along with the variation of the input voltage Vin, resulting in variation in illumination of the light emitting diodes LED1 and LED2.

SUMMARY OF THE INVENTION

An object of the present invention is to provide an LED driver and control method for real constant average current regulation of an LED lighting apparatus.

Another object of the present invention is to provide an LED driver and control method which eliminate the need of an output capacitor.

Yet another object of the present invention is to provide an LED driver and control method which eliminate the need of a rectifier diode in most applications.

Still another object of the present invention is to provide a size-reduced and lower cost LED driver.

Still yet another object of the present invention is to provide an LED driver and control method applicable to various circuit configurations.

According to the present invention, an LED driver extracts the LED lighting current information from an LED path to produce a first signal including an AC component and a DC component, and extracts the DC component information of the first signal to produce a second signal to regulate an average of the LED lighting current.

From one aspect of the present invention, the power stage connected to the LED path is simplified by eliminating the output capacitor.

In accordance with another aspect of the present invention, a feedback loop uses a filter to acquire a difference between the average of the LED lighting current and a setting value.

Yet another aspect of the present invention is to directly control the ripple and DC level of the LED lighting current.

In still another aspect of the present invention, the control signal may have constant on-time or off-time.

In yet still another aspect of the present invention, the control signal may have constant switching frequency.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 23 is the first embodiment of the current sensor;

FIG. 24 is the second embodiment of the current sensor;

FIG. 25 is the third embodiment of the current sensor;

DETAIL DESCRIPTION OF THE INVENTION

Figure 7:
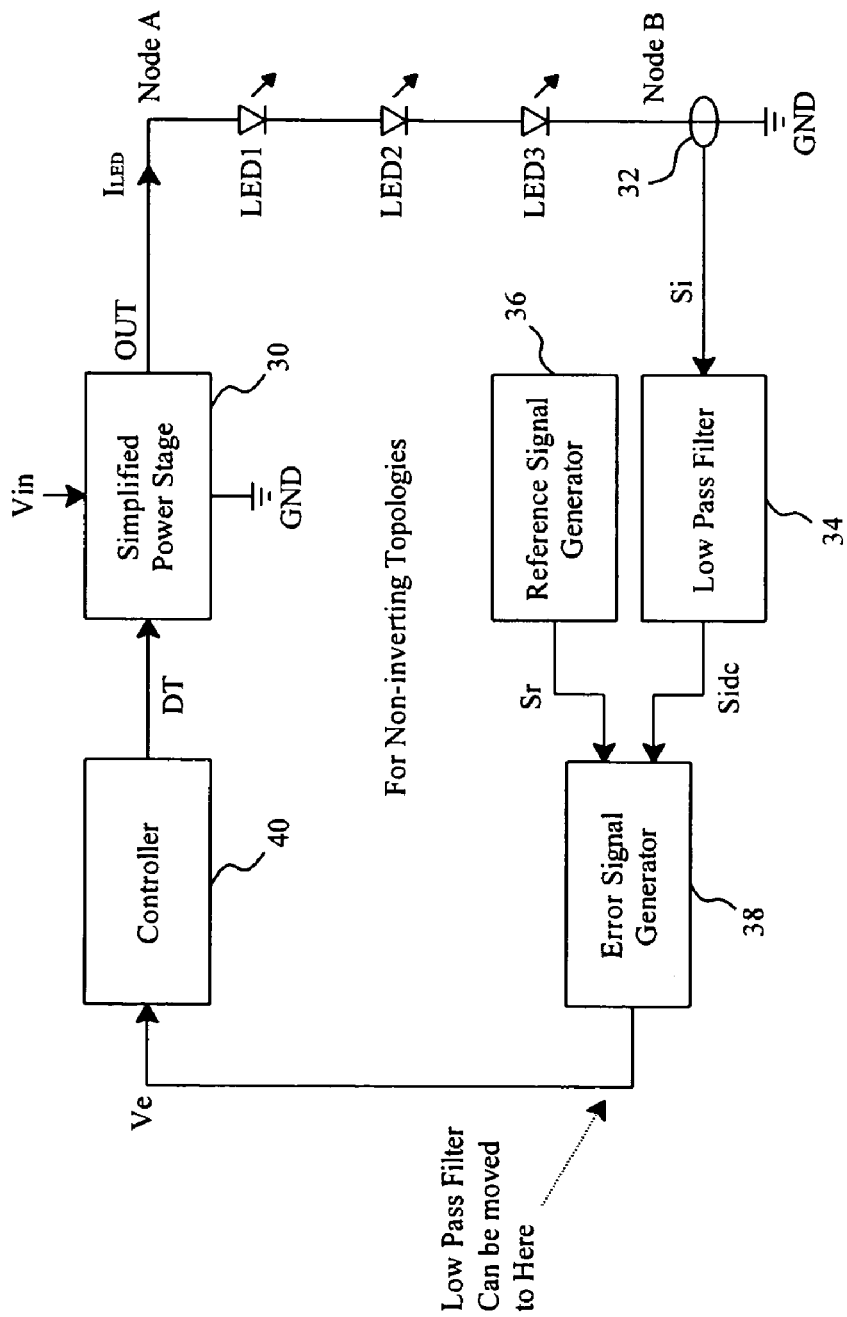
FIG. 7 is a non-inverting LED driver according to the present invention.

FIG. 7 shows an LED driver having a non-inverting configuration according to the present invention, which provides an LED lighting current $I_{LED}$ to an LED path built between nodes A and B, with light emitting diodes LED1-LED3 thereon. The node A is connected to a simplified power stage 30 of the LED driver and the node B is connected to a current-sensor 32, and to a ground terminal GND. For the lighting control of LED1-LED3, a feedback loop provides an error signal Ve to a controller 40 of the LED driver, so as to determine a control signal DT to operate the simplified output stage 30, and thus the simplified power stage 30 regulates the LED lighting current $I_{LED}$ according to the control signal DT.

Figure 1:
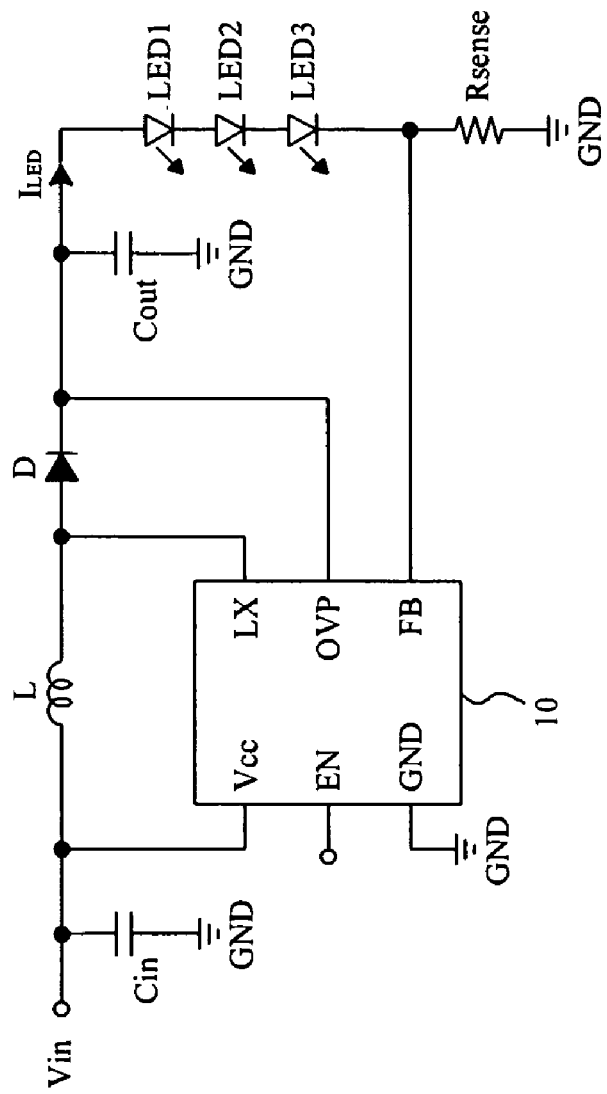
FIG. 1 is an application circuit given in the data sheet of RT9271.
Figure 2:
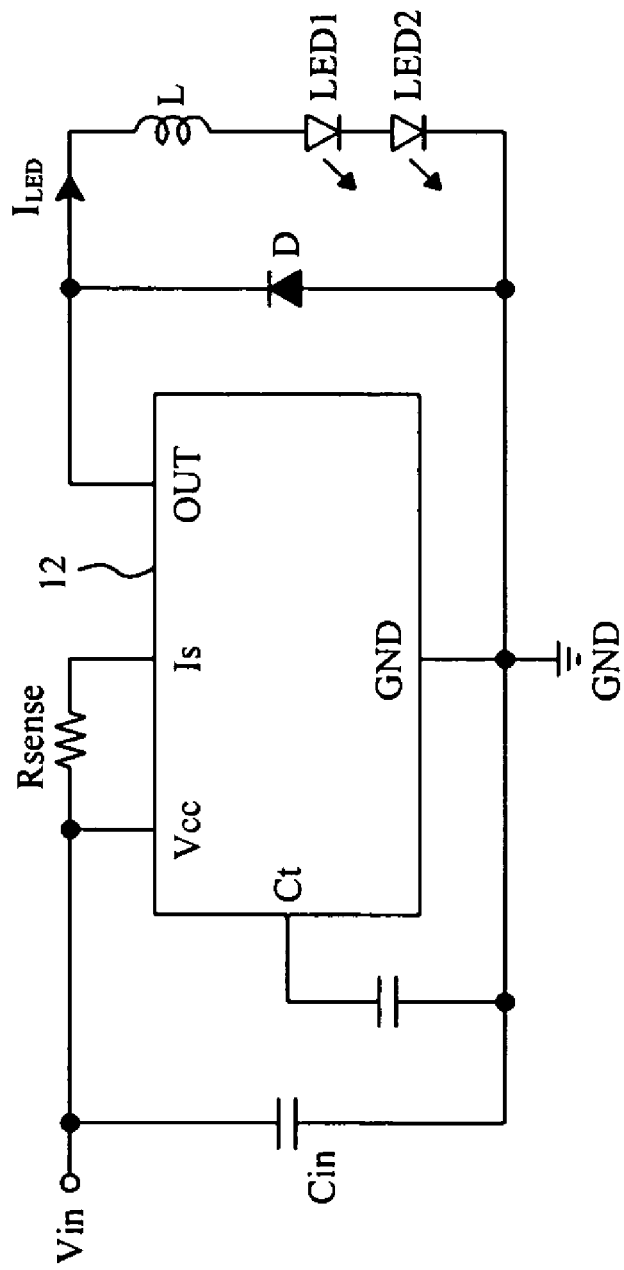
FIG. 2 is an application circuit given in the data sheet of AMC7150.
Figure 3:
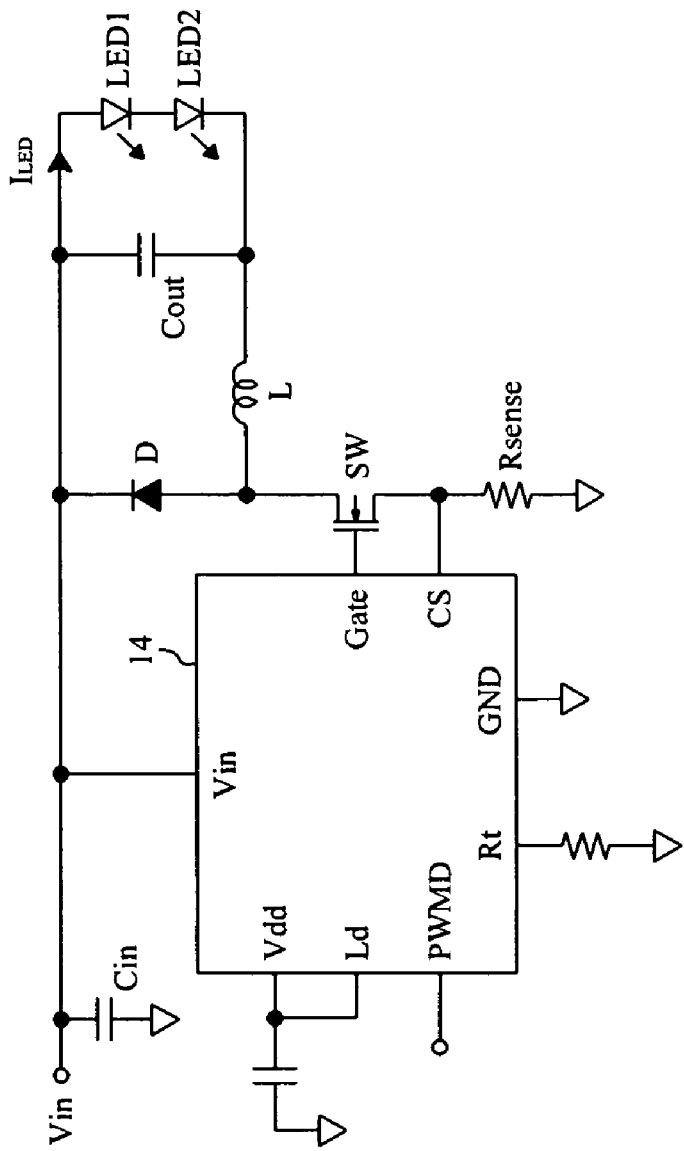
FIG. 3 is an application circuit given in the data sheet of HV9910.
Figure 6:
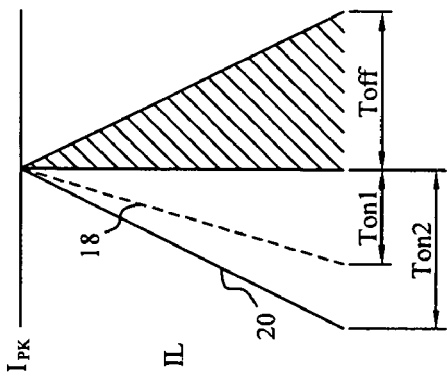
FIG. 6 shows the inductor current of the circuit of FIG. 5 along the variation of the input voltage.
Figure 5:
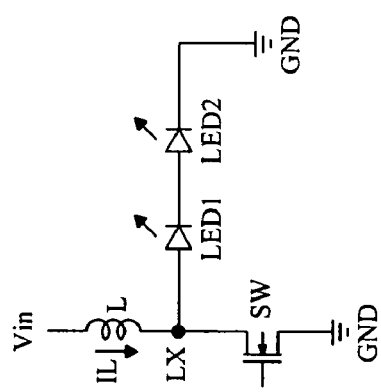
FIG. 5 depicts a boost LED driver.
Figure 4:
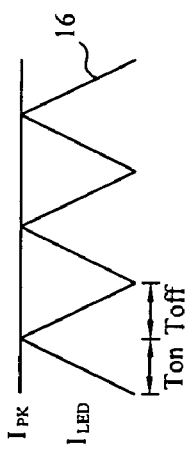
FIG. 4 illustrates the operational principle of the control circuits of FIGS. 2 and 3.

In the feedback loop, the current sensor 32 monitors the LED lighting current $I_{LED}$ to generate a current sense signal Si; a low-pass filter 34 filters the current sense signal Si to generate a DC level signal Sidc that represents the average of the LED lighting current $I_{LED}$; a reference signal generator 36 provides a preset reference signal Sr that represents a preset value for the average of the LED lighting current $I_{LED}$; and an error signal generator 38 generates the error signal Ve according to the difference between the signals Sidc and Sr. When the DC level signal Sidc is higher than the reference signal Sr, it means that the average of the LED lighting current $I_{LED}$ is higher than the preset value. On the contrary, when the DC level signal Sidc is lower than the signal Sr, it means that the average of the LED lighting current LED is lower than the preset value. The controller 40 modifies DT for controlling the magnitude of the LED lighting current LED according to the error signal Ve so as to regulate the average of the LED lighting current $I_{LED}$ at the preset value. The simplified power stage 30 does not require a large filtering capacitor at its output terminal OUT, and thus the size and cost thereof are reduced. Though the low-pass filter 34, in some applications, may need a capacitor to filter the current sense signal Si, it adequates merely a small low-voltage one, and as compared with the output capacitor Cout of FIG. 1, the cost of such a small capacitor can be almost ignored.

In another embodiment, the low-pass filter 34 may be moved to the position between the error signal generator 38 and the controller 40. Thus, the comparison of the current sense signal Si and the reference signal Sr by the error signal generator 38 is done first, and the output of the error signal generator 38 is filtered by the low-pass filter 34 next to generate the final error signal Ve. Alternatively, an error signal generator with very low bandwidth may be employed as the element 38 which thus simultaneously includes the functions of a low-pass filter. In other embodiments, the current sensor 32 may sense the LED lighting current $I_{LED}$ at a position other than the node B, such as the node A, or any part of the LED path, or any part out of the LED path at which the magnitude information of the LED lighting current $I_{LED}$ can be extracted.

Figure 8:
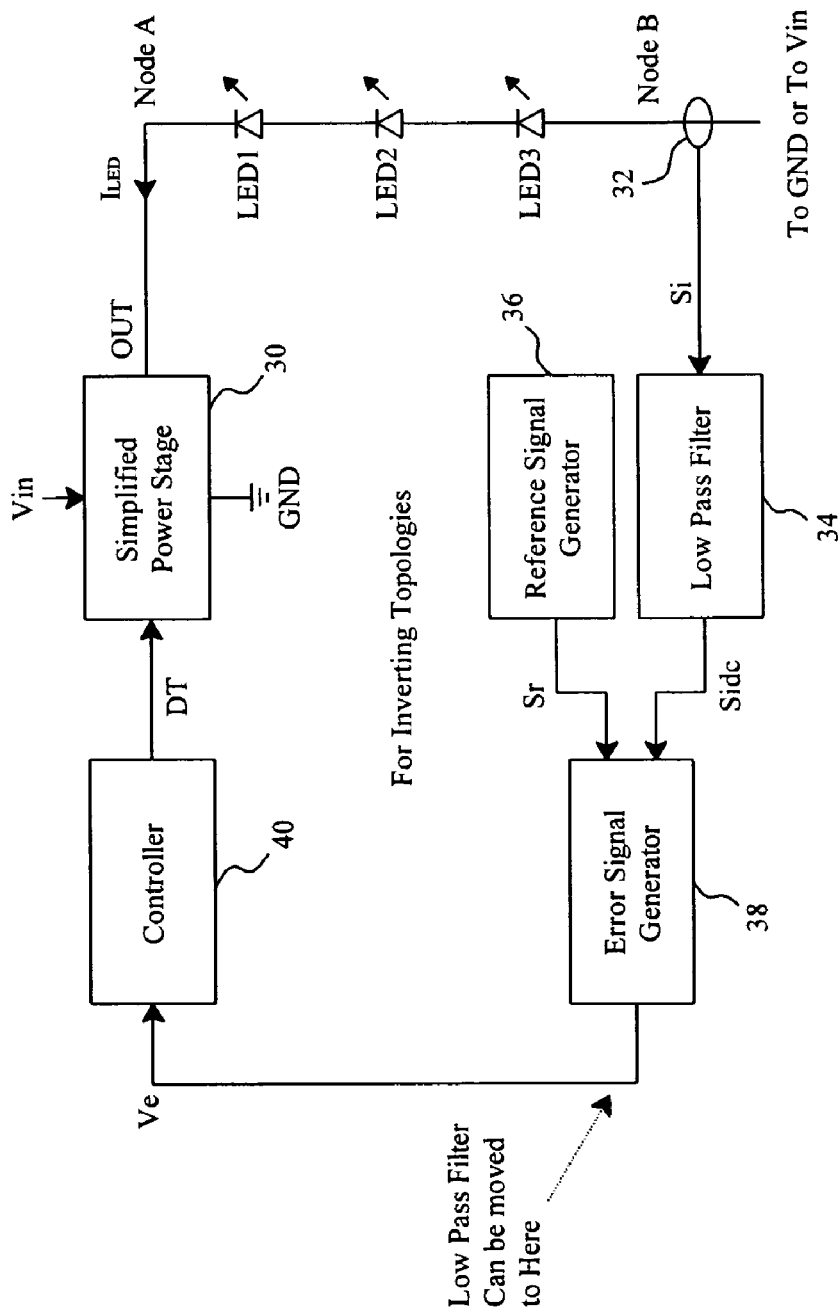
FIG. 8 is an inverting LED driver according to the present invention.

FIG. 8 shows an LED driver having an inverting configuration according to the present invention, in which the output of the simplified power stage 30 is a current-sinking terminal, and the node B is connected to a ground terminal GND or any power sourcing node, such as Vin. The light emitting diodes current $I_{LED}$ flowing therethrough is opposite in direction to that of the embodiment shown in FIG. 7, while the rest of the configuration and principle are identical to those of the embodiment shown in FIG. 7. Likewise, the low-pass filter 34 can be moved to the position between the error signal generator 38 and the controller 40, or be included in an error signal generator with low bandwidth.

The following circuits show various embodiments of the simplified switching mode power stages according to the present invention. Each simplified switching mode power stage includes at least one power switch, switching according to the control signal DT to regulate the LED lighting current $I_{LED}$.

Figures 9, 10, 11:
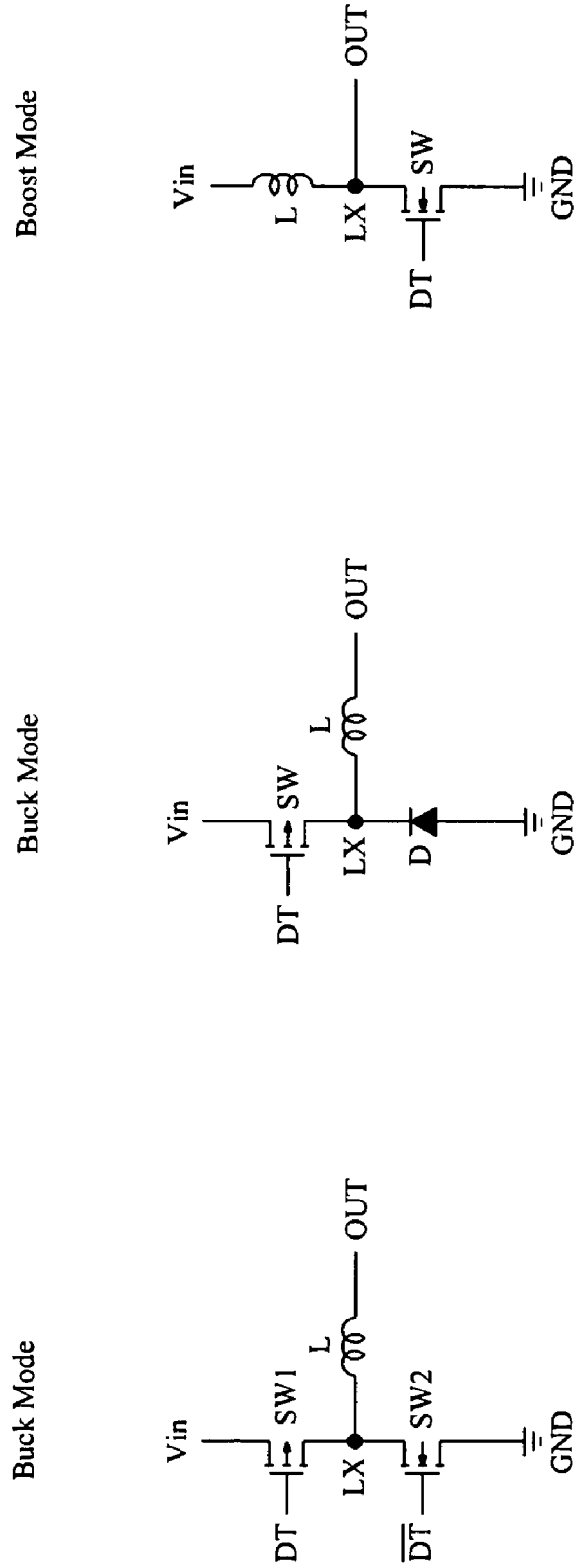
FIG. 9 shows a simplified power stage of a synchronous buck configuration.
FIG. 10 shows a simplified power stage of an asynchronous buck configuration.
FIG. 11 shows a simplified power stage of a boost configuration.
Figure 14:
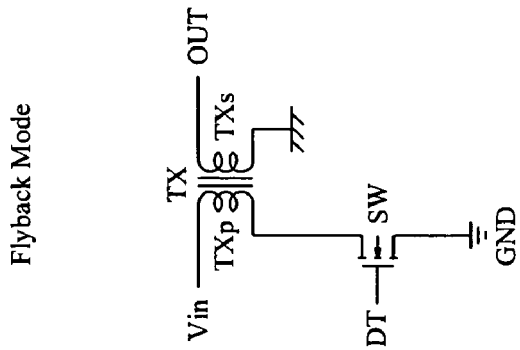
FIG. 14 shows a simplified power stage of a flyback configuration.
Figure 13:
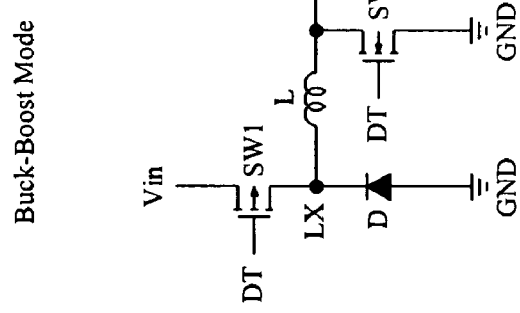
FIG. 13 shows a simplified power stage of an asynchronous buck-boost configuration.
Figure 12:
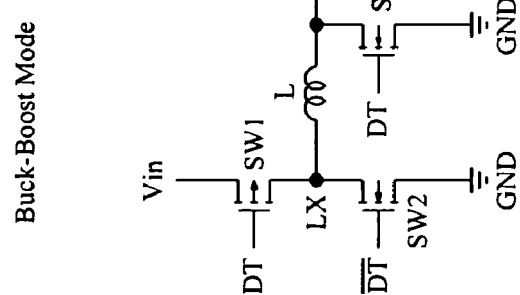
FIG. 12 shows a simplified power stage of a synchronous buck-boost configuration.

FIGS. 9 to 14 provide several embodiments applicable to the simplified power stage 30 of FIG. 7. FIG. 9 shows a simplified power stage configured in synchronous buck mode, in which power switches SW1 and SW2 are serially connected between the power input Vin and ground terminal GND, an inductor L is connected between the phase node LX and output terminal OUT, and the control signal DT is a PWM signal or a variant frequency modulation (VFM) signal to switch the power switches SW1 and SW2. FIG. 10 shows a simplified power stage configured in asynchronous buck mode, in which a power switch SW and a diode D are serially connected between the power input Vin and ground terminal GND, an inductor L is connected between the phase node LX and output terminal OUT, and the control signal DT is a PWM signal or a VFM signal to switch the power switch SW. FIG. 11 shows a simplified power stage configured in boost mode, in which an inductor L and a power switch SW are serially connected between the power input Vin and ground terminal GND, the output OUT is directly drawn out from the phase node LX, and the control signal DT is a PWM signal or a VFM signal to switch the power switch SW. Conventionally, an asynchronous boost mode power stage includes a rectifier diode between the phase node LX and output terminal OUT. However, in this embodiment, since the output terminal OUT is connected to the light emitting diodes, the light emitting diodes can act as the rectifier so as to save a diode at the output terminal OUT. FIG. 12 shows a simplified power stage configured in synchronous buck-boost mode, in which power switches SW1 and SW2 are serially connected between the power input Vin and ground terminal GND, an inductor L is connected between the phase node LX and output terminal OUT, another power switch SW3 is connected between the output terminal OUT and ground GND, and the control signal DT is a PWM signal or a VFM signal to switch the power switches SW1, SW2 and SW3. FIG. 13 shows a simplified power stage configured in asynchronous buck-boost mode, in which a power switch SW1 and a diode D are serially connected between the power input Vin and ground terminal GND, an inductor L is connected between the phase node LX and output terminal OUT, another power switch SW2 is connected between the output terminal OUT and ground terminal GND, and the control signal DT is a PWM signal or a VFM signal to switch the power switches SW1 and SW2. FIG. 14 shows a simplified power stage configured in flyback mode, in which a primary coil TXp of a transformer TX and a power switch SW are serially connected between the power input Vin and ground terminal GND, a secondary coil TXs of the transformer TX is connected between the output terminal OUT and another ground terminal, and the control signal DT is a PWM signal or a VFM signal to switch the power switch SW. Conventionally, a flyback mode power stage includes a rectifier diode between the secondary coil TXs and the output terminal OUT. However, in this embodiment, since the output terminal OUT is connected to the light emitting diodes, the light emitting diodes can act as the rectifier so as to save a diode at the output terminal OUT.

Figure 15:
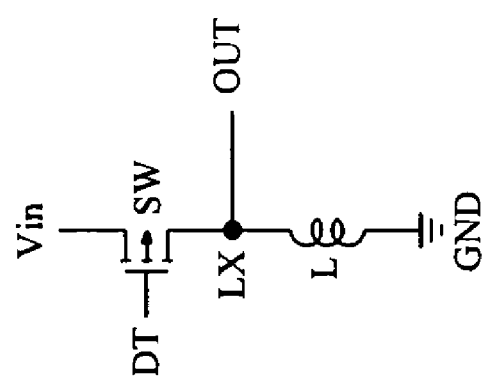
FIG. 15 shows a simplified power stage of an inverting configuration.
Figure 16:
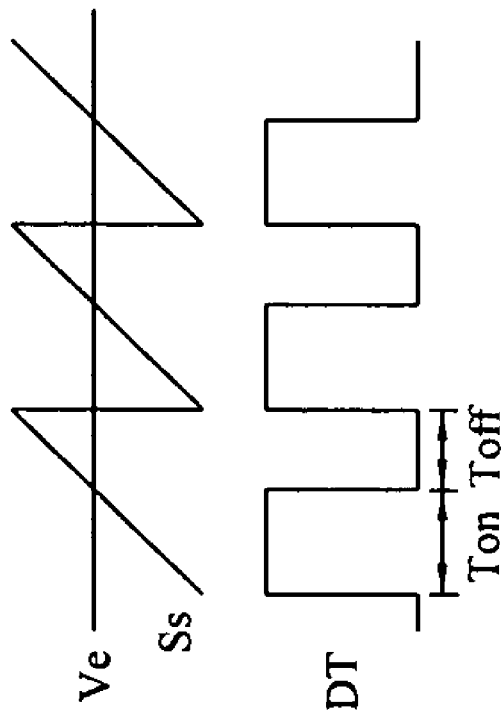
FIG. 16 is a pulse width modulation (PWM) regulation loop.
Figure 16:
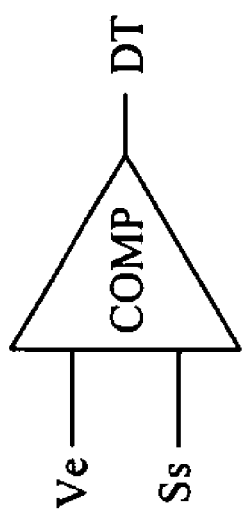

FIG. 15 shows an embodiment applicable to the simplified power stage 30 of FIG. 8, in which a power switch SW and an inductor L are serially connected between the power input Vin and ground terminal GND, the output terminal OUT directly sinks the LED current to the phase node LX, and the control signal DT is a PWM signal or a VFM signal to switch the power switch SW. Conventionally, an inverting mode power stage includes a power switch or a rectifier diode between the phase node LX and the output terminal OUT. However, in this embodiment, since the output terminal OUT is connected to the light emitting diodes, it saves a power switch or a diode at the output terminal OUT.

The above exemplary simplified power stages operate in the same manner as conventional power stages but require no large filtering capacitor at the output terminal OUT, and thus have smaller circuits and lower costs.

As shown in the foregoing embodiments, the LED driver of the present invention can be applicable to almost all types of power stages.

FIGS. 16 to 19 provide several embodiments for the controller 40 of FIG. 7 or FIG. 8. As shown by the PWM loop in the left part of FIG. 16, this embodiment employs a comparator COMP to compare the error signal Ve and a signal Ss to generate a PWM signal DT to adjust the level of the LED lighting current $I_{LED}$ and thereby to keep the average value of the LED lighting current $I_{LED}$ constant. The signal Ss is in saw-tooth-like waveform, which can be the load current (the LED lighting current in this case) feedback signal, or an oscillating signal generated by a ramping oscillator. If the signal Ss is a load current feedback signal, it includes both the DC and AC components of the LED lighting current $I_{LED}$, which is provided by the LED current sensor circuit. For this current sensor circuit, it can be identical or similar to the current sensor 32 of FIG. 7 and FIG. 8, and the position where it senses the current can be the same as or different from that of the current sensor 32. The PWM waveform diagram is illustrated in the right part of FIG. 16. Similar to the general PWM control, the on time Ton of the PWM signal DT is during the time period that the signal Ss is lower than the signal Ve, and the off time Toff of the PWM signal DT is during the time period that the signal Ss is higher than the signal Ve. The on-time Ton or the off-time Toff of the PWM signal DT determines the ripple and DC level of the LED lighting current $I_{LED}$. When the average value of the LED lighting current $I_{LED}$ changes, the error signal Ve will change accordingly, and the on-time Ton or the off-time Toff of the PWM signal DT will also change. The change of Ton and Toff will adjust the DC level of the LED lighting current $I_{LED}$ back to the preset level, thereby the average value of the LED lighting current $I_{LED}$ is kept constant.

Figure 17:
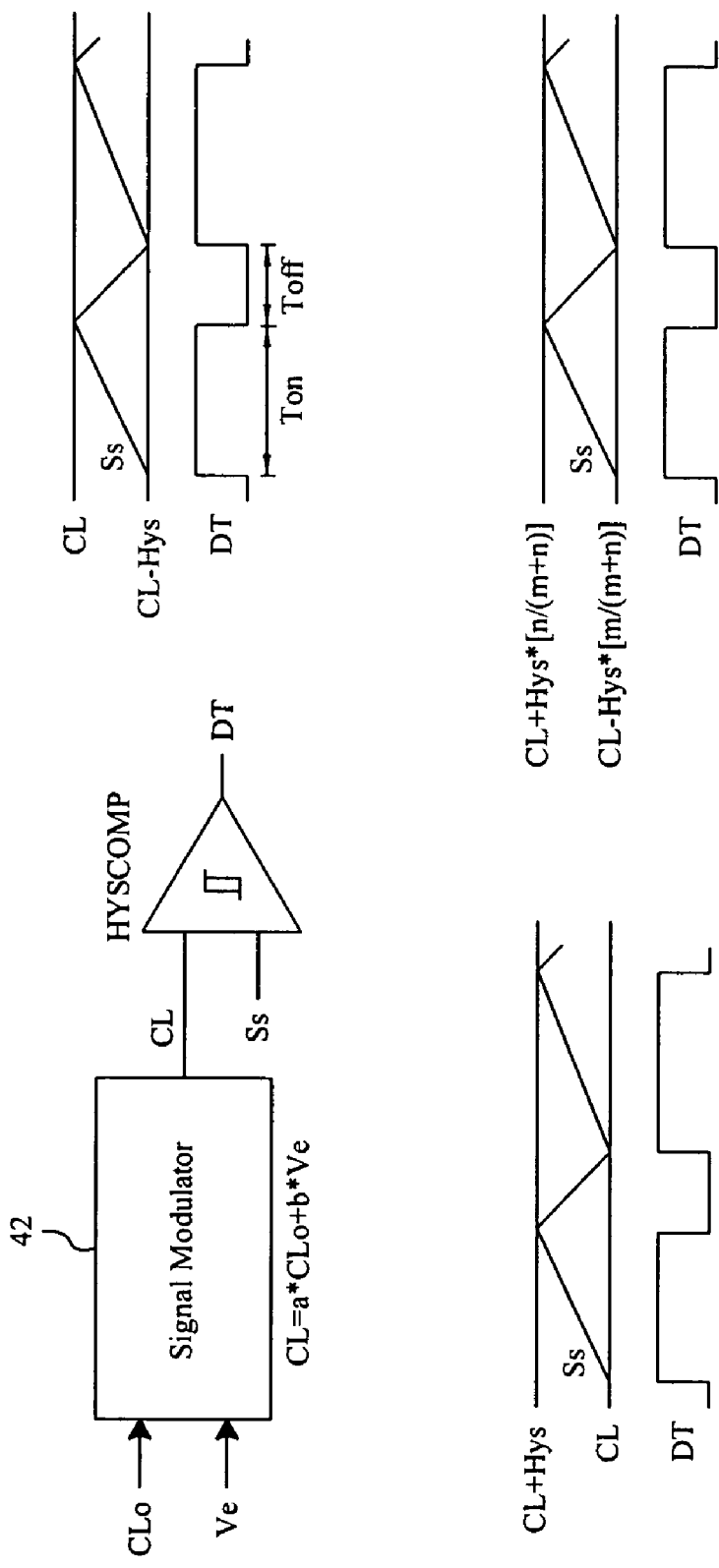
FIG. 17 is a hysteresis mode regulation loop.

FIG. 17 provides a hysteresis mode regulation loop and a waveform diagram thereof. In such regulation control, a signal modulator 42 modulates a current limit setting CLo according to the error signal Ve to generate a final current limit level CL $$CL=a \times CLo+b \times Ve, \qquad [\text{EQ-1}]$$

where a is a constant greater than 0 and b is a constant greater or smaller than 0. In this embodiment, the signal Ss is the LED lighting current feedback signal, which is provided by the LED current sensor circuit. The equation EQ-1 is merely for an example and other modulation functions are also feasible. A hysteresis comparator HYSCOMP has a preset hysteresis parameter Hys to determine another current limit setting CL−Hys. The hysteresis parameter Hys represents the hysteresis gap width. The signal Ss is compared with the current limit settings CL and CL−Hys to generate the control signal DT. The time period that the signal Ss rises from CL−Hys to CL is the on-time Ton of the control signal DT, and the time period that the signal Ss descends from CL to CL−Hys is the off-time Toff of the control signal DT. When the average of the LED lighting current $I_{LED}$ varies, the error signal Ve varies accordingly and the final current limit level CL also varies accordingly so as to modulate the peak and valley levels of the LED lighting current LED, thereby keeping the average value of the LED lighting current LED constant. The upper and lower limits for the signal Ss in the hysteresis mode regulation control may be set in various other ways. For instance, two alternative embodiments are provided at the lower part of FIG. 17. In the left waveform diagram, the current limits are set as CL+Hys and CL, respectively, and in the right waveform diagram, the current limits are set as CL+Hys×[n/(m+n)] and CL−Hys×[m/(m+n)], respectively, where m and n are coefficients for modulating the center value of the hysteresis gap.

Figure 18:
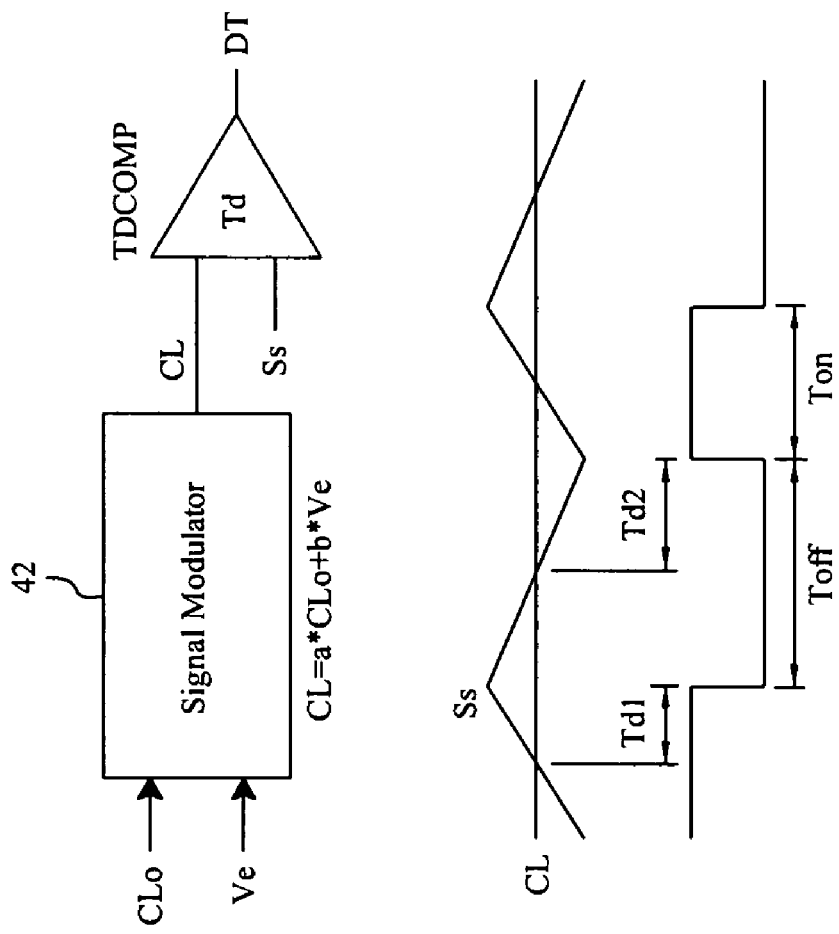
FIG. 18 is a delay mode regulation loop.

FIG. 18 provides a delay mode regulation loop and a waveform diagram thereof, in which a signal modulator 42 generates a final current limit level CL according to the error signal Ve and a current limit setting CLo, and a delay comparator TDCOMP compares the signals CL and Ss to generate the control signal DT. In this embodiment, the signal Ss is the LED lighting current feedback signal, which is provided by the LED current sensor circuit. The modulation function of the signal modulator 42 for example may be the equation EQ-1, or others. When the signal Ss rises up to or over CL, the control signal DT starts the off-time Toff after a delay time Td1, and until the signal Ss falls down below CL, the control signal DT starts the on-time Ton after another delay time Td2. The delay times Td1 and Td2 are determined by the parameters of the delay comparator TDCOMP. Since the final current limit level CL varies along with the variation of the error signal Ve, when the average of the LED lighting current $I_{LED}$ varies, the final current limit level CL varies accordingly to correspondingly modulate the DC level of the LED lighting current $I_{LED}$, thereby keeping the average value of the LED lighting current $I_{LED}$ constant. In some embodiments, one of the delay times Td1 and Td2 can be as to realize a constant off-time mode or a constant on-time mode.

Figure 19:
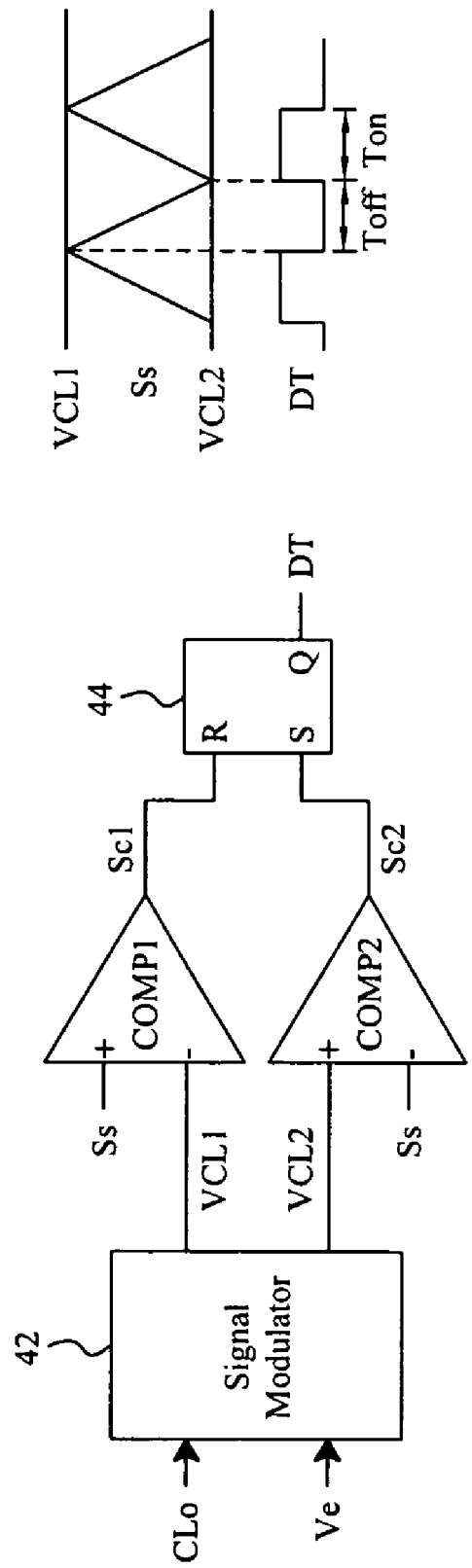
FIG. 19 is a hysteresis mode regulation loop in different structure from that in FIG. 17.

FIG. 19 provides another embodiment for the controller 40, in which a signal modulator 42 generates two final current limit levels VCL1 and VCL2 according to a current limit setting CLo and the error signal Ve for being compared with the signal Ss by two comparators COMP1 and COMP2 respectively, so as to generate signals Sc1 and Sc2 as the reset signal R and the set signal S of a flip-flop 44 to determine the control signal DT. In this embodiment, the signal Ss is the LED lighting current feedback signal, which is provided by the LED current sensor circuit. As shown by the waveform diagram in the right part of FIG. 19, when the signal Ss rises up to VCL1, the output Sc1 of the comparator COMP1 resets the flip-flop 44 and thereby the control signal DT enters the off-time Toff. When the signal Ss falls down to VCL2, the output Sc2 of the comparator COMP2 sets the flip-flop 44 and thereby the control signal DT enters the on-time Ton. Since the final current limit levels VCL1 and VCL2 vary along with the variation of the error signal Ve, when the average value of the LED lighting current $I_{LED}$ varies, the final current limit levels VCL1 and VCL2 vary accordingly, so as to modulate the peak level and valley level of the LED lighting current $I_{LED}$, thereby keeping the average value of the LED lighting current $I_{LED}$ constant.

The circuits of FIGS. 16 to 19 can be used to realize the controller 40 not only individually, but also combinationally. A combinational scheme can be constructed by a combination of any part of one circuit of FIGS. 16 to 19 and another part of another circuit of FIGS. 16 to 19.

Figure 22:
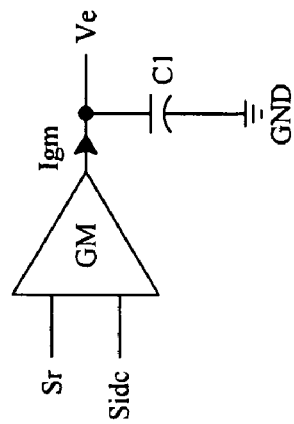
FIG. 22 is the third embodiment of the error signal generator.
Figure 21:
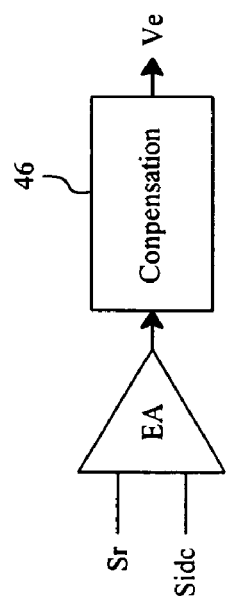
FIG. 21 is the second embodiment of the error signal generator.
Figure 20:
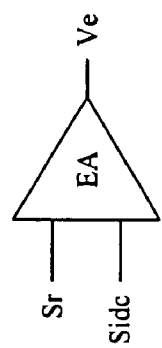
FIG. 20 is the first embodiment of the error signal generator.

FIGS. 20 to 22 provide some embodiments for the error signal generator 38. In FIG. 20, an error amplifier EA amplifies the difference between the DC level signals Sdc and reference signal Sr to generate the error signal Ve. In FIG. 21, a compensator 46 is further added to compensate the output of the error amplifier EA so as to enhance the stability of the error signal Ve and the stability of the whole control loop. In FIG. 22, a transconductive amplifier GM generates a current Igm according to the difference between the signals Sdc and Sr to charge and discharge a capacitor C1, so as to generate the error signal Ve. As another embodiment, a current output comparator may be used to substitute for the transconductive amplifier GM of FIG. 22.

FIGS. 23 to 25 provide some embodiments for the current sensor circuit 32. In FIG. 23, a current sense resistor Rsense is inserted between the node B and ground terminal GND, and the voltage across the current sense resistor Rsense when the LED lighting current LED flows through the current sense resistor Rsense is taken as the current sense signal Si. As described above, there are various positions of where the current sensor 32 may sense current. In FIG. 24, the current sense resistor Rsense is connected between the node A and the simplified power stage 30, and the voltage across the current sense resistor Rsense when the LED lighting current $I_{LED}$ flows through the current sense resistor Rsense is taken as the current sense signal Si. In another embodiment, the LED lighting current $I_{LED}$ may be alternatively sensed from the simplified power stage 30. As shown in FIG. 25, the current sensor 32 includes a serial combination of capacitor C1 and resistor R1 shunt to the inductor L of the simplified power stage, and the voltage across the capacitor C1 is taken as the current sense signal Si. In addition to the circuits of FIGS. 23 to 25, many other circuits may be used to sense the LED lighting current $I_{LED}$ under the teachings of the present invention.

Figure 26:
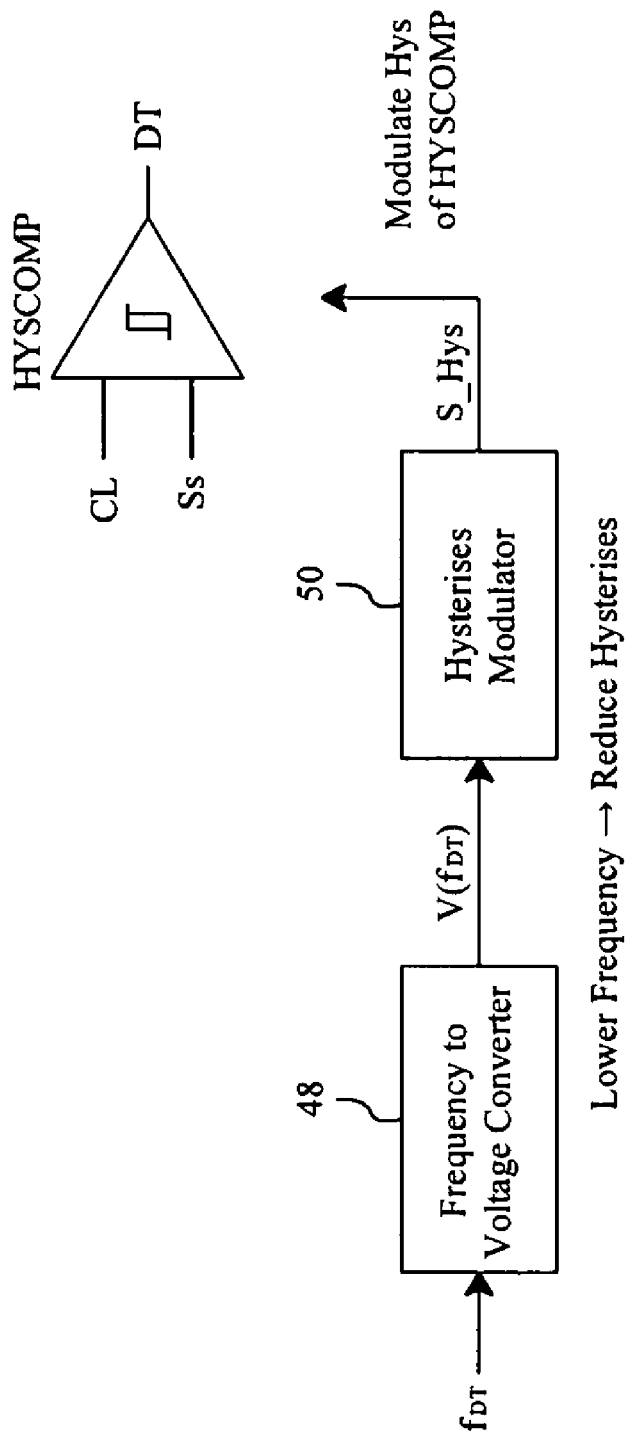
FIG. 26 is a frequency regulation loop.
Figure 27:
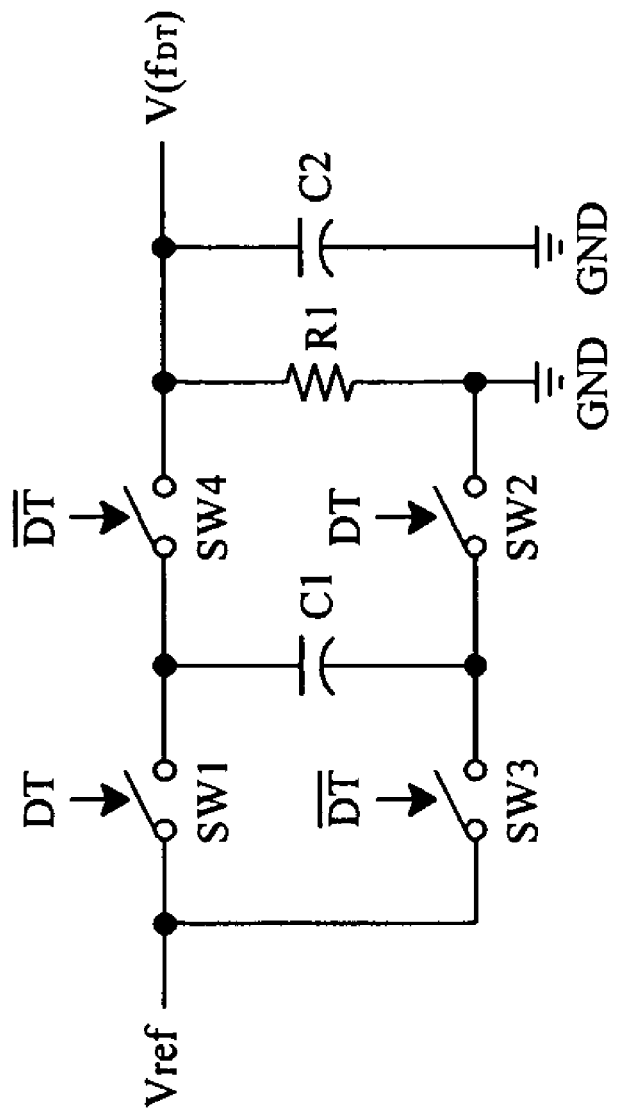
FIG. 27 is a frequency to voltage converter.

In case using a hysteresis mode regulation control, such as the loop shown in FIG. 17, an additional regulation loop may be added to modulate the switching frequency of the control signal DT to hold it constant or less-variant. FIG. 26 provides an embodiment of frequency regulation loop, which includes a frequency to voltage converter 48 to convert the switching frequency $f_{DT}$ of the control signal DT into a voltage $V(f_{DT})$, and a hysteresis modulator 50 to generate a modulation signal S_Hys according to the voltage $V(f_{DT})$ to modulate the hysteresis parameter Hys of the hysteresis comparator HYSCOMP, so as to maintain the switching frequency $f_{DT}$ of the control signal DT constant. For instance, when the switching frequency $f_{DT}$ of the control signal DT increases, the hysteresis parameter Hys is increased. On the contrary, when the switching frequency $f_{DT}$ of the control signal DT decreases, the hysteresis parameter Hys is decreased. Alternatively, the frequency regulation loop of FIG. 26 may be also used to partially correct the variation of the switching frequency $f_{DT}$ of the control signal DT so as to limit the variation of the switching frequency $f_{DT}$ of the control signal DT within a specific range. FIG. 27 provides an embodiment circuit for the frequency to voltage converter 48 of FIG. 26, which is a charge pump with switches SW1, SW2, SW3 and SW4 operating according to the control signal DT, so as to convert a reference voltage Vref into the voltage $V(f_{DT})$. When the switching frequency $f_{DT}$ of the control signal DT is higher, the switches SW1 to SW4 are switched more rapidly and therefore the voltage $V(f_{DT})$ on a capacitor C2 becomes higher.

Figure 28:
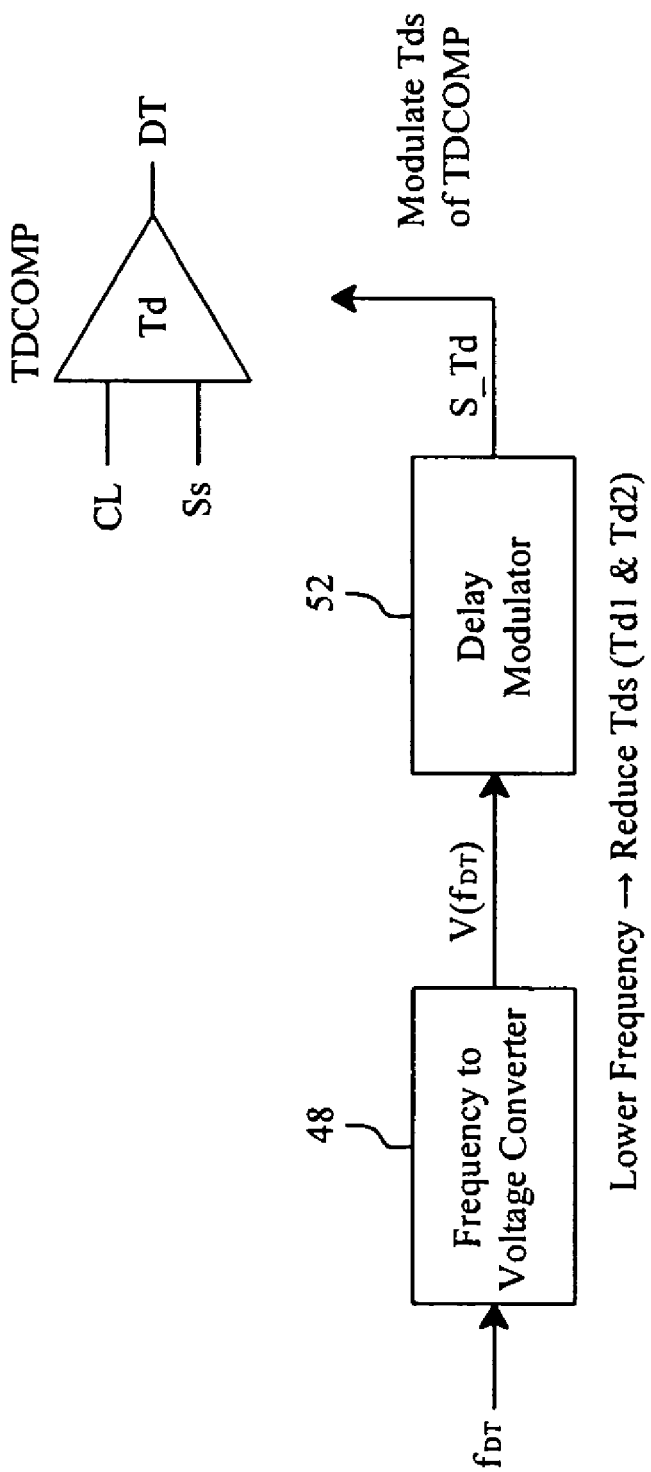
FIG. 28 is a frequency regulation loop.

In case using a delay mode regulation loop, such as the loop shown in FIG. 18, an additional regulation loop may be added to modulate the switching frequency of the control signal DT to hold it constant or less-variant. As shown in FIG. 28, the frequency to voltage converter 48 converts the switching frequency $f_{DT}$ of the control signal DT into the voltage $V(f_{DT})$, and a delay modulator 52 generates a modulation signal S_Td according to the voltage $V(f_{DT})$ to modulate the delay times Td1 and Td2 of the delay comparator TDCOMP so as to fix the switching frequency $f_{DT}$ of the control signal DT or to partially correct the variation of the switching frequency $f_{DT}$ of the control signal DT to limit it in a specific range.

Figure 29:
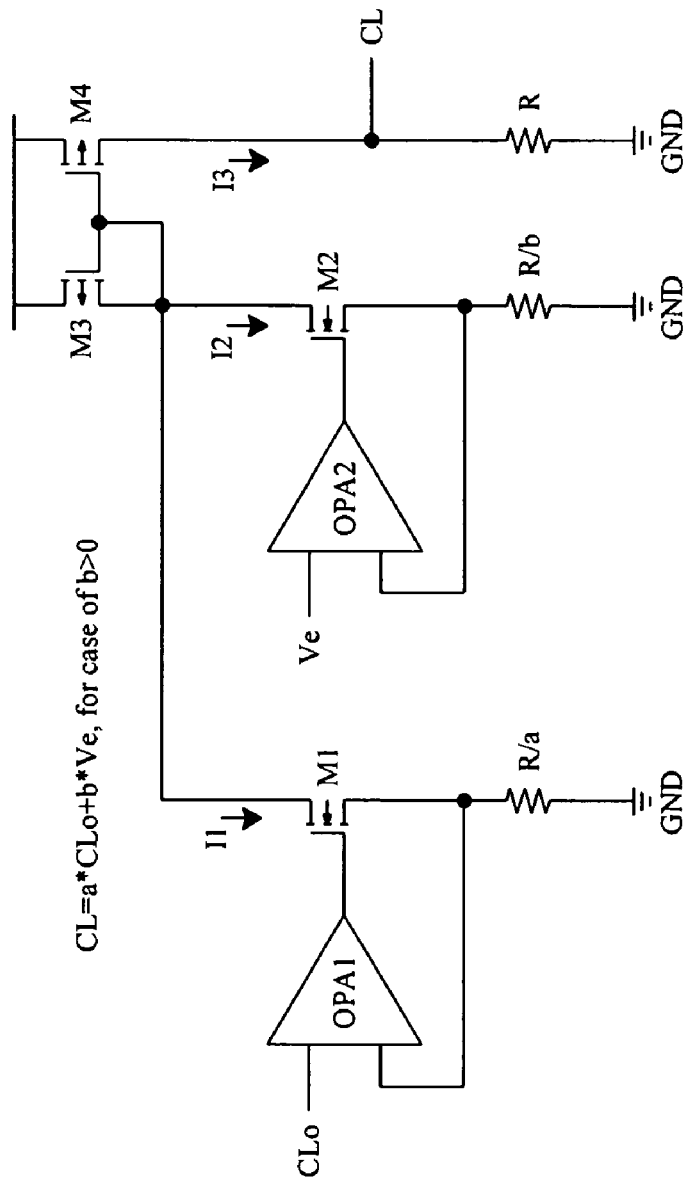
FIG. 29 is the first embodiment of the signal modulator.
Figure 30:
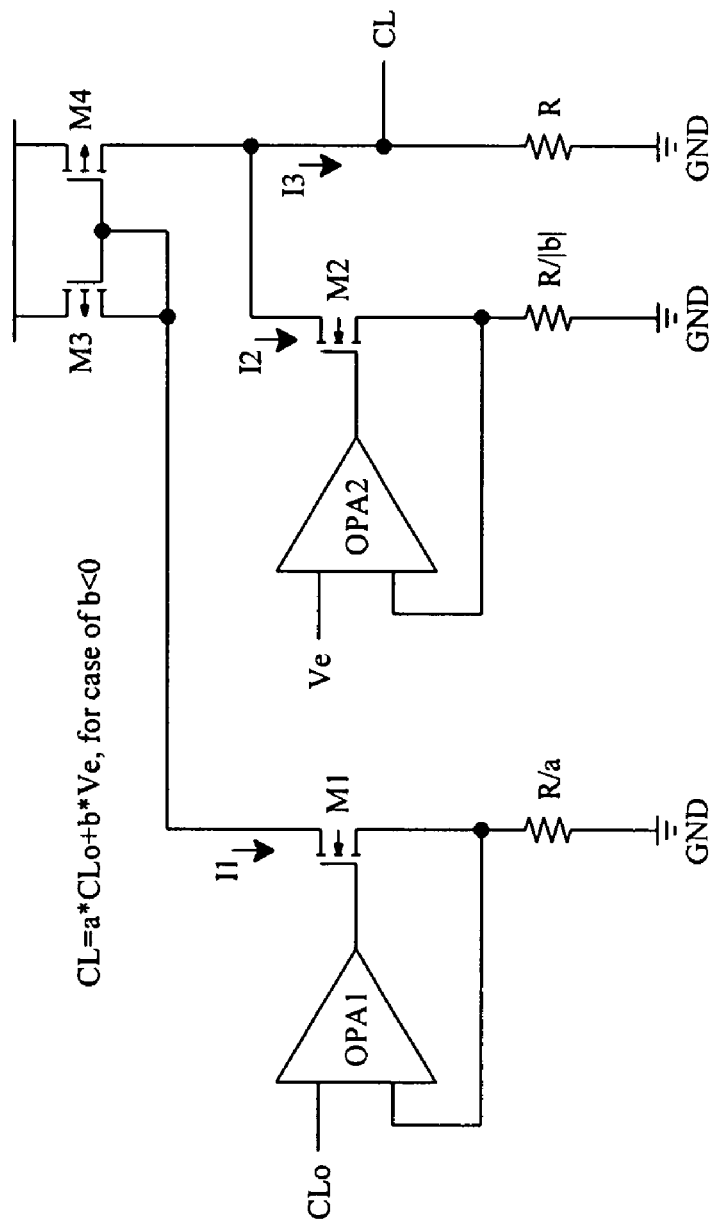
FIG. 30 is the second embodiment of the signal modulator.

FIGS. 29 and 30 provide embodiments for the signal modulators 42 of FIGS. 17 and 18. FIG. 29 is a circuit designed based on the condition that constants a and b are both greater than zero, in which the combination of transistor M1, operational amplifier OPA1 and resistor R/a converts the voltage CLo into a current $$I1 = a \times CLo/R,\qquad\qquad\text{[EQ-2]}$$

the combination of transistor M2, operational amplifier OPA2 and resistor R/b converts the voltage Ve into a current $$I2 = b \times Ve/R, \quad [\text{EQ-3}]$$

the current mirror constructed by transistors M3 and M4 produces the mirrored current $$I3 = I1 + I2, \quad [\text{EQ-4}]$$

and the current I3 flows through a resistor R to produce the voltage $$CL = (I1 + I2) \times R \quad [\text{EQ-5}]$$
$$= a \times CLo + b \times Ve.$$

FIG. 30 is a circuit designed based on the condition that constant a is greater than zero and constant b is smaller than zero, in which the combination of transistor M1, operational amplifier OPA1 and resistor R/a converts the voltage CLo into a current I1 as shown in the equation EQ-2, the combination of transistor M2, operational amplifier OPA2 and resistor R/|b| converts the voltage Ve into a current $$I2 = |b| \times Ve/R, \quad [\text{EQ-6}]$$

the current mirror constructed by transistors M3 and M4 produces a mirrored current $$I2 + I3 = I1, \quad [\text{EQ-7}]$$

consequently, $$I3 = I1 - I2, \quad [\text{EQ-8}]$$

and the current I3 flows through the resistor R to produce the voltage $$CL = (I1 - I2) \times R \quad [\text{EQ-9}]$$
$$= a \times CLo + b \times Ve.$$

By combining the exemplatory circuits of FIGS. 29 and 30, two final current limit levels CL1 and CL2 can be provided to act as the modulator 42 of FIG. 19.

Although a single LED path particular has been exemplified in the embodiments and descriptions for the purpose of illustration, it will be readily understood by those ordinarily skilled in the art that there are many methods to distribute a current into plural paths in a specific proportion. For example, matching elements or current sharing resistors may be serially connected between the parallel paths to conduct current shunting. Hence, any approach implementing the method disclosed in the present invention in conjunction with current distribution technology for driving plural LED paths is within the scope of the present invention as disclosed in the claims.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. An LED driver, comprising:
    an output terminal providing an LED path with an LED lighting current including an AC component and a DC component;
    a first circuit acquiring a first signal relating to the LED lighting current;
    a second circuit extracting a DC component of the first signal to generate a second signal; and
    a power stage responsive to the second signal to regulate the LED lighting current.

2. The LED driver of claim 1, wherein the power stage is a simplified power stage without an output capacitor connected thereto.

3. The LED driver of claim 1, wherein the first circuit comprises a current sensor monitoring the LED lighting current to generate the first signal.

4. The LED driver of claim 1, wherein the second circuit comprises a low-pass filter filtering the first signal to generate the second signal.

5. The LED driver of claim 1, further comprising:
    a reference signal generator providing a third signal representing a preset value for an average of the LED lighting current;
    an error signal generator generating an error signal according to a difference between the second signal and the third signal; and
    a controller providing a control signal according to the error signal for the power stage to regulate the LED lighting current.

6. The LED driver of claim 5, wherein the controller comprises a comparator comparing the error signal with an oscillating signal to generate the control signal.

7. The LED driver of claim 5, wherein the controller comprises:
    a signal modulator modulating a current limit setting according to the error signal to generate a final current limit level; and
    a hysteresis comparator with a hysteresis parameter, generating the control signal according to the final current limit level and a signal representing the LED current value.

8. The LED driver of claim 7, further comprising a frequency regulation loop modulating the hysteresis parameter.

9. The LED driver of claim 5, wherein the controller comprises:
    a signal modulator modulating a current limit setting according to the error signal to generate a final current limit level; and
    a delay comparator with at least one delay parameter, generating the control signal according to the final current limit level and a signal representing the LED current value.

10. The LED driver of claim 9, further comprising a frequency regulation loop modulating the at least one delay parameter.

11. The LED driver of claim 5, wherein the controller comprises:
    a signal modulator modulating a current limit setting according to the error signal to generate two final current limit levels;
    two comparators comparing the two final current limit levels with a signal representing the LED current value respectively, to generate a reset signal and a set signal; and
    a flip-flop responsive to the reset signal and the set signal to generate the control signal.

12. The LED driver of claim 1, wherein the first circuit comprises:
    a current sensor monitoring the LED lighting current to generate a current sense signal;

a reference signal generator providing a third signal representing a preset value for an average of the LED lighting current; and an error signal generator generating the first signal according to a difference between the current sense signal and the third signal.

13. The LED driver of claim 12, further comprising a controller providing a control signal according to the second signal for the power stage to regulate the LED lighting current.

14. The LED driver of claim 13, wherein the controller comprises a comparator comparing the second signal with an oscillating signal to generate the control signal.

15. The LED driver of claim 13, wherein the controller comprises:
   a signal modulator modulating a current limit setting according to the second signal to generate a final current limit level; and
   a hysteresis comparator with a hysteresis parameter, generating the control signal according to the final current limit level and a signal representing the LED current value.

16. The LED driver of claim 15, further comprising a frequency regulation loop modulating the hysteresis parameter.

17. The LED driver of claim 13, wherein the controller comprises:
   a signal modulator modulating a current limit setting according to the second signal to generate a final current limit level; and
   a delay comparator with at least one delay parameter, generating the control signal according to the final current limit level and a signal representing the LED current value.

18. The LED driver of claim 17, further comprising a frequency regulation loop modulating the at least one delay parameter.

19. The LED driver of claim 13, wherein the controller comprises:
   a signal modulator modulating a current limit setting according to the second signal to generate two final current limit levels;
   two comparators comparing the two final current limit levels with a signal representing the LED current value respectively, to generate a reset signal and a set signal; and
   a flip-flop responsive to the reset signal and the set signal to generate the control signal.

20. A control method for an LED driver, comprising the steps of:
   providing an LED lighting current for an LED path;
   from the LED path, extracting a first signal including an AC component and a DC component;
   processing the first signal to generate a second signal representing the DC component of the first signal; and
   regulating an average of the LED lighting current according to the second signal.

21. The control method of claim 20, wherein the step of extracting the first signal from the LED path comprises monitoring the LED lighting current to generate the first signal.

22. The control method of claim 20, wherein the step of processing the first signal to generate a second signal comprises low-pass filtering the first signal to generate the second signal.

23. The control method of claim 21, wherein the step of regulating an average of the LED lighting current according to the second signal comprises the steps of:
   generating an error signal according to a difference between the second signal and a preset value; and
   regulating the average of the LED lighting current according to the error signal.

24. The control method of claim 23, wherein the step of regulating the average of the LED lighting current according to the error signal comprises generating a control signal according to the error signal to regulate the average of the LED lighting current.

25. The control method of claim 24, wherein the step of generating the control signal according to the error signal comprises comparing the error signal with an oscillating signal to generate the control signal.

26. The control method of claim 24, wherein the step of generating the control signal according to the error signal comprises the steps of:
   modulating a current limit setting according to the error signal to generate a final current limit level; and
   determining an upper limit and a lower limit for the LED lighting current according to a hysteresis parameter and the final current limit level;
   wherein the control signal turns to a first state when the LED lighting current rises up to the upper limit, and turns to a second state when the LED lighting current falls down to the lower limit.

27. The control method of claim 26, further comprising modulating the hysteresis parameter.

28. The control method of claim 27, wherein the hysteresis parameter is so modulated that the control signal has a constant switching frequency.

29. The control method of claim 24, wherein the step of generating the control signal according to the error signal comprises the steps of:
   modulating a current limit setting according to the error signal to generate a final current limit level; and
   comparing the LED lighting current with the final current limit level to determine the control signal;
   wherein when the LED lighting current increases over the final current limit level, the control signal transits to a first state after a first delay time, and then, until the LED lighting current decreases below the final current limit level, the control signal transits to a second state after a second delay time.

30. The control method of claim 29, wherein one of the first time and the second time is substantially zero.

31. The control method of claim 29, further comprising modulating the first time and the second time.

32. The control method of claim 31, wherein the first time and the second time are so modulated that the control signal has a constant switching frequency.

33. The control method of claim 24, wherein the step of generating the control signal according to the error signal comprises the steps of:
   modulating a current limit setting according to the error signal to generate a first final current limit level and a second final current limit level; and
   comparing the LED lighting current with the first and second final current limit levels to determine the control signal;
   wherein the control signal turns to a first state when the LED lighting current rises up to the first final current limit level, and turns to a second state when the LED lighting current falls down to the second final current limit level.

34. The control method of claim 20, wherein the step of extracting the first signal from the LED path comprises the steps of:

monitoring the LED lighting current to generate a current sense signal;

providing a third signal representing a preset value for an average of the LED lighting current; and generating the first signal according to a difference between the current sense signal and the third signal.

35. The control method of claim 34, wherein the step of regulating the average of the LED lighting current according to the second signal comprises generating a control signal according to the second signal to regulate the average of the LED lighting current.

36. The control method of claim 35, wherein the step of generating a control signal according to the second signal comprises comparing the second signal with an oscillating signal to generate the control signal to regulating the average of the LED lighting current.

37. The control method of claim 35, wherein the step of generating a control signal according to the second signal comprises the steps of:

modulating a current limit setting according to the second signal to generate a final current limit level; and determining an upper limit and a lower limit for the LED lighting current according to a hysteresis parameter and the final current limit level;

wherein the control signal turns to a first state when the LED lighting current rises up to the upper limit, and turns to a second state when the LED lighting current falls down to the lower limit.

38. The control method of claim 37, further comprising modulating the hysteresis parameter.

39. The control method of claim 38, wherein the hysteresis parameter is so modulated that the control signal has a constant switching frequency.

40. The control method of claim 35, wherein the step of generating the control signal according to the second signal comprises the steps of:

modulating a current limit setting according to the second signal to generate a final current limit level; and comparing the LED lighting current with the final current limit level to determine the control signal;

wherein when the LED lighting current increases over the final current limit level, the control signal transits to a first state after a first delay time, and then, until the LED lighting current decreases below the final current limit level, the control signal transits to a second state after a second delay time.

41. The control method of claim 40, wherein one of the first delay time and the second delay time is substantially zero.

42. The control method of claim 40, further comprising modulating the first delay time and the second delay time.

43. The control method of claim 42, wherein the first delay time and the second delay time are so modulated that the control signal has a constant switching frequency.

44. The control method of claim 35, wherein the step of generating the control signal according to the second signal comprises the steps of:

modulating a current limit setting according to the second signal to generate a first final current limit level and a second final current limit level; and comparing the LED lighting current with the first and second final current limit levels to determine the control signal;

wherein the control signal turns to a first state when the LED lighting current rises up to the first final current limit level, and turns to a second state when the LED lighting current falls down to the second final current limit level.

45. A lighting apparatus, comprising:

an LED path having at least one LED thereon;

a power stage providing the LED path with an LED lighting current including an AC component and a DC component; and a feedback loop acquiring an information of the DC component of the LED lighting current to control the power stage to regulate the LED lighting current.

46. The lighting apparatus of claim 45, wherein the feedback loop comprises:

a first circuit acquiring a first signal relating to the LED lighting current; and a second circuit processing the first signal to generate a second signal representing a DC component of the first signal.

47. The lighting apparatus of claim 46, wherein the first circuit comprises a current sensor monitoring the LED lighting current to generate the first signal.

48. The lighting apparatus of claim 46, wherein the second circuit comprises a low-pass filter filtering the first signal to generate the second signal.

49. The lighting apparatus of claim 47, wherein the feedback loop further comprises:

a reference signal generator providing a third signal representing a preset value for an average of the LED lighting current;

an error signal generator generating an error signal according to a difference between the second signal and the third signal; and a controller providing a control signal according to the error signal for the power stage to regulate the LED lighting current.

50. The lighting apparatus of claim 49, wherein the controller comprises a comparator comparing the error signal with an oscillating signal to generate the control signal.

51. The lighting apparatus of claim 49, wherein the controller comprises:

a signal modulator modulating a current limit setting according to the error signal to generate a final current limit level; and a hysteresis comparator with a hysteresis parameter, generating the control signal according to the final current limit level and the LED lighting current.

52. The lighting apparatus of claim 51, further comprising a frequency regulation loop modulating the hysteresis parameter.

53. The lighting apparatus of claim 49, wherein the controller comprises:

a signal modulator modulating a current limit setting according to the error signal to generate a final current limit level; and a delay comparator with at least one delay parameter, generating the control signal according to the final current limit level and the LED lighting current.

54. The lighting apparatus of claim 53, further comprising a frequency regulation loop modulating the at least one delay parameter.

55. The lighting apparatus of claim 49, wherein the controller comprises:

a signal modulator modulating a current limit setting according to the error signal to generate two final current limit levels;

two comparators comparing the two final current limit levels with the LED lighting current respectively, to generate a reset signal and a set signal; and a flip-flop responsive to the reset signal and the set signal to generate the control signal.

56. The lighting apparatus of claim 46, wherein the first circuit comprises:
- a current sensor monitoring the LED lighting current to generate a current sense signal;
- a reference signal generator providing a third signal representing a preset value for an average of the LED lighting current; and
- an error signal generator generating the first signal according to a difference between the current sense signal and the third signal.

57. The lighting apparatus of claim 56, further comprising a controller providing a control signal according to the second signal for the power stage to regulating the LED lighting current.

58. The lighting apparatus of claim 57, wherein the controller comprises a comparator comparing the second signal with an oscillating signal to generate the control signal.

59. The lighting apparatus of claim 57, wherein the controller comprises:
- a signal modulator modulating a current limit setting according to the second signal to generate a final current limit level; and
- a hysteresis comparator with a hysteresis parameter, generating the control signal according to the final current limit level and the LED lighting current.

60. The lighting apparatus of claim 59, further comprising a frequency regulation loop modulating the hysteresis parameter.

61. The lighting apparatus of claim 57, wherein the controller comprises:
- a signal modulator modulating a current limit setting according to the second signal to generate a final current limit level; and
- a delay comparator with at least one delay parameter, generating the control signal according to the final current limit level and the LED lighting current.

62. The lighting apparatus of claim 61, further comprising a frequency regulation loop modulating the at least one delay parameter.

63. The lighting apparatus of claim 57, wherein the controller comprises:
- a signal modulator modulating a current limit setting according to the second signal to generate two final current limit levels;
- two comparators comparing the two final current limit levels with the LED lighting current respectively, to generate a reset signal and a set signal; and
- a flip-flop responsive to the reset signal and the set signal to generate the control signal.

64. The LED driver of claim 1, further comprising a reference signal generator providing a third signal representing a preset value for an average of the LED lighting current, and wherein the second circuit includes an error signal generator generating the second signal according to a difference between the first signal and the third signal.

65. The LED driver of claim 64, wherein the second circuit further includes a low-pass filter coupled with the error signal generator.

66. The LED driver of claim 64, wherein the error signal generator has a low bandwidth.

67. The LED driver of claim 5, wherein the controller comprises a comparator comparing the error signal with a signal representing the LED current value to generate the control signal.

68. The LED driver of claim 67, wherein said signal representing the LED current value is said first signal.

69. The LED driver of claim 67, wherein said signal representing the LED current value is said first signal.

70. The LED driver of claim 9, wherein said signal representing the LED current value is said first signal.

71. The LED driver of claim 11, wherein said signal representing the LED current value is said first signal.

72. The LED driver of claim 13, wherein the controller comprises a comparator comparing the second signal with a signal representing the LED current value to generate the control signal.

73. The LED driver of claim 15, wherein said signal representing the LED current value is said first signal.

74. The LED driver of claim 17, wherein said signal representing the LED current value is said first signal.

75. The LED driver of claim 19, wherein said signal representing the LED current value is said first signal.

76. The LED driver of claim 20, wherein said signal representing the LED current value is said first signal.

77. The control method of claim 20, wherein the step of processing the first signal to generate a second signal comprises the steps of: generating the second signal according to a difference between the first signal and a preset value.

78. The control method of claim 20, wherein the step of processing the first signal to generate a second signal comprises the steps of: generating an error signal according to a difference between the first signal and a preset value, and filtering the error signal to generate the second signal.

79. The control method of claim 24, wherein the step of generating the control signal according to the error signal comprises comparing the error signal with a signal representing the LED current value to generate the control signal.

80. The control method of claim 79, wherein said signal representing the LED current value is said first signal.

81. The lighting apparatus of claim 49, wherein the controller comprises a comparator comparing the error signal with a signal representing the LED current value to generate the control signal.

82. The lighting apparatus of claim 81, the said signal representing the LED current value is the said first signal.

83. The lighting apparatus of claim 46, wherein the feedback loop further comprises a reference signal generator providing a third signal representing a preset value for an average of the LED lighting current, and wherein the second circuit includes an error signal generator generating the second signal according to a difference between the first signal and the third signal.

84. The lighting apparatus of claim 83, wherein the second circuit further includes a low-pass filter coupled with the error signal generator.

85. The lighting apparatus of claim 83, wherein the error signal generator has a low bandwidth.

86. The lighting apparatus of claim 57, wherein the controller comprises a comparator comparing the second signal with a signal representing the LED current value to generate the control signal.

87. The lighting apparatus of claim 57, wherein said signal representing the LED current value is said first signal.

* * * * *